United States Patent [19]

Monden

[11] Patent Number: 5,155,998

[45] Date of Patent: Oct. 20, 1992

[54] SUPERCHARGING PRESSURE CONTROL SYSTEM FOR AN AUTOMOTIVE ENGINE

[75] Inventor: Hitoshi Monden, Mitaka, Japan

[73] Assignee: Fuji Jukogyo Kabushiki Kaisha, Tokyo, Japan

[21] Appl. No.: 455,944

[22] Filed: Dec. 22, 1989

[30] Foreign Application Priority Data

Dec. 27, 1988 [JP] Japan .................... 63-334875

[51] Int. Cl.$^5$ ............................................ F02B 37/12
[52] U.S. Cl. ......................................................... 60/602
[58] Field of Search ................. 60/600, 601, 602, 603

[56] References Cited

U.S. PATENT DOCUMENTS

| | | | |
|---|---|---|---|
| 4,671,067 | 6/1987 | Abo | 60/602 |
| 4,691,521 | 9/1987 | Hirabayashi | 60/602 |
| 4,697,421 | 10/1987 | Otobe | 60/602 |
| 4,709,553 | 12/1987 | Ueno | 60/602 |
| 4,769,994 | 9/1988 | Hirabayashi | 60/602 |

FOREIGN PATENT DOCUMENTS 60-212625 10/1985 Japan .
61-55316 3/1986 Japan .

Primary Examiner—Richard A. Bertsch
Assistant Examiner—Peter Korytnyk
Attorney, Agent, or Firm—Martin A. Farber

[57] ABSTRACT

An automotive engine has a turbocharger including a turbine, a compressor driven by the turbine, and a wastegate valve provided in a bypass around the turbine, and an actuator for operating the wastegate valve so as to prevent intake pressure from becoming extremely high. The system has an intake pressure sensor for detecting the intake pressure and a throttle position sensor for detecting a throttle position. A basic control value is determined in accordance with driving conditions of the engine, and a feedback control value is calculated in accordance with the difference between the intake pressure detected by the intake pressure sensor and a limit value. When a peak of the intake pressure is detected in the acceleration state of the engine, the basic control value and the feedback control value are combined, and the actuator is driven in accordance with the combined control value.

11 Claims, 6 Drawing Sheets

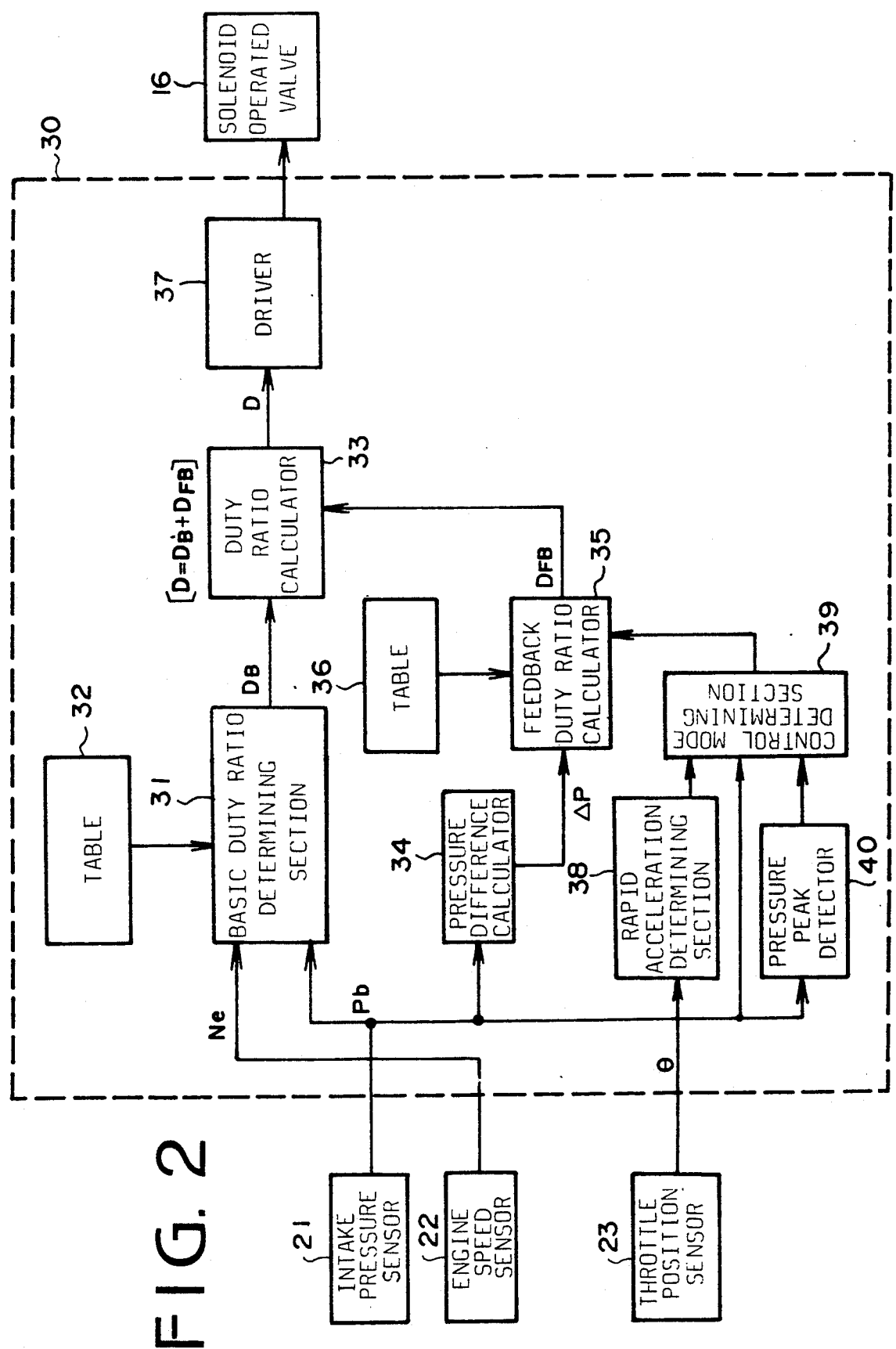

ical control system for an automotive engine. SUPERCHARGING PRESSURE CONTROL
SYSTEM FOR AN AUTOMOTIVE ENGINE

BACKGROUND OF THE INVENTION

The present invention relates to a system for controlling supercharging pressure in an automotive engine having a turbocharger, and more particularly to a system for electronically controlling the operation of a wastegate valve.

In an automotive engine having a turbocharger, the wastegate valve is provided in a bypass around a turbine of the turbocharger so as to divert exhaust gas away from the turbine so that the supercharging pressure is kept substantially constant to prevent knocking of the engine. The wastegate valve is generally controlled by a feedback control system in accordance with a desired valve.

Japanese Patent Application Laid-Open 61-55316 discloses a feedback control system wherein the difference between an actual supercharging pressure detected by a supercharging pressure sensor and a desired intake pressure is calculated and the supercharging pressure is controlled by a PI control dependent on the calculated difference.

However, when the vehicle is rapidly accelerated, the control operation of the wastegate valve delayed with respect to the opening speed of the throttle valve of the vehicle, which causes extremely high supercharging pressure because of the overshooting of the control.

If a feedforward control is employed, such an overshooting can be reduced. However, the feedforward control can not satisfactorily control the supercharging pressure to a desired value. Therefore, it is preferable to correct the deviation of the controlled supercharging pressure from the desired value with the feedback control. However, if both the controls are effected at the same time, overshoot values in a transient state are added which excessively increases the supercharging pressure.

SUMMARY OF THE INVENTION

The object of the present invention is to provide a control system where excessive supercharging pressure may be decreased.

The other objects and features of this invention will be apparently understood from the following description with reference to the accompanying drawings.

BRIEF DESCRIPTION OF DRAWINGS

FIG. 2 is a block diagram showing a control unit of the present invention;

DETAILED DESCRIPTION OF THE PREFERRED EMBODIMENT

Figure 1:
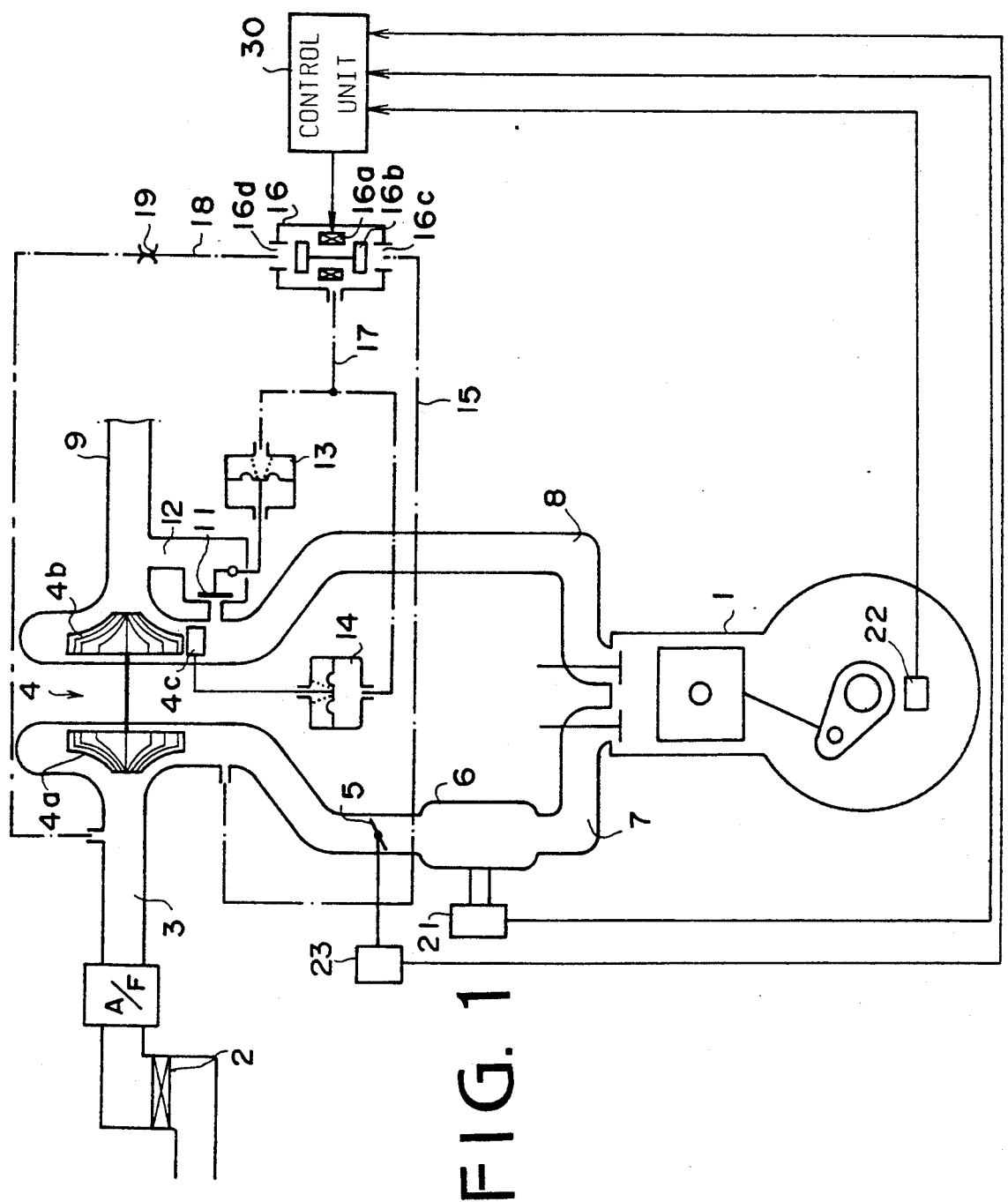
FIG. 1 is a schematic diagram showing a system of the present invention.

Referring to FIG. 1, a turbocharger 4 includes a compressor 4a having an impeller and a turbine 4b consisting of a turbine wheel. An inlet port of the compressor 4a is communicated with an air cleaner 2 through an intake pipe 3, and an outlet port thereof is communicated with cylinders of an engine 1 through a throttle valve 5, a chamber 6 and an intake manifold 7. The turbine 4b is located between an exhaust manifold 8 and an exhaust pipe 9. The impeller of the compressor 4a is mounted on the same shaft as the turbine wheel. When the turbine 4b is operated by exhaust gas from the engine 1 through the exhaust manifold 8, the impeller is rotated by the turbine for compressing the intake air. Thus, the compressed intake air is supplied to the engine cylinders.

An exhaust bypass 12 is provided around the turbine 4b, and a wastegate valve 11 which is operated by a diaphragm operated actuator 13 is provided in the bypass 12. A chamber of the diaphragm operated actuator 13 is communicated with the intake pipe 3 through a passage 17, a three-way solenoid operated valve 16 and a passage 15 downstream of the compressor 4a.

The solenoid operated valve 16 has a solenoid 16a and a valve body 16b. Upon energization of the solenoid 16a in response to a control signal in the form of pulses applied from a control unit 30, the valve body 16b is moved to open a pressure supply port 16c communicated with the passage 15 and to close leak port 16d communicated with an upstream portion of the compressor 4a through a passage 18 having an orifice 19. Thus the intake pressure is applied to the actuator 13 through the passage 15, valve 16 and passage 17. When the pressure of the intake air becomes higher than a predetermined value, the diaphragm of the actuator 13 is deflected to open the wastegate valve 11. To the contrary, when the leak port 16d is opened, the intake air leaks therefrom so that the actuator 13 is applied with a low pressure to close the wastegate valve 11. The opening quantity of the wastegate valve 11 is thus dependent on the duty ratio of the control pulse signal fed from the control unit 30 to the solenoid 16a.

The turbocharger 4 further has a vane 4c at the inlet of the turbine 4b. The vane 4c is operated by a diaphragm operated actuator 14, a chamber of which is also communicated with the valve 16 through the passage 17. When a high pressure is applied to the chamber of the actuator 14, the diaphragm of the actuator 14 is deflected to rotate the vane 4c so as to decrease the opening area of the exhaust pipe 9 at the vane. Thus, the exhaust gas is discharged passing through the wastegate valve 11 without driving the turbine 4b.

The system is further provided with an intake pressure sensor 21 downstream of the throttle valve 5, an engine speed sensor 22 and a throttle position sensor 23, outputs of which are supplied to the control unit 30.

Figures 3A, 3B:
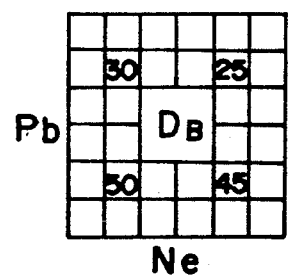
FIGS. 3a and 3b show tables storing basic duty ratios and increments and decrements of feedback duty ratio, respectively.

Referring to FIG. 2, the control unit 30 has, as a feedforward control system, a basic duty ratio determining section 31 to which engine speed Ne from the engine speed sensor 22 and intake pressure Pb from the intake pressure sensor 21 are applied. At the duty ratio determining section 31, a basic duty ratio $D_B$ for the pulse signal is derived from a basic duty ratio table 32 which is schematically shown in FIG. 3a. The values of the basic duty ratios $D_B$ are determined so as to control the pressure Pb to a limit intake pressure Pt in steady driving states under various conditions dependent on the intake pressure Pb and the engine speed Ne. The limit pressure Pt is set to, for example, a maximum pressure for the full throttle state of the engine. Namely, in a low engine speed and low intake pressure range, the value of the basic duty ratio $D_B$ is large so that the solenoid valve 16 is operated to open the leak port 11d. The actuating pressure applied to the actuators 13 and 14 is decreased, thereby closing the wastegate valve 11 and rotating the vane 4c to increase the opening area. As the engine speed Ne and the intake pressure Pb increase, the actuating pressure is increased, opening the wastegate valve 11 and decreasing the opening area at the vane 4c.

The control unit 30 further has, as a feedback control system, a pressure difference calculator 34 to which the intake pressure Pb is fed for calculating the difference (error) $\Delta P$ between the limit pressure Pt and the actual intake pressure Pb in accordance with $\Delta P = Pb - Pt$. The difference $\Delta P$ is applied to a feedback duty ratio calculator 35 where a feedback duty ratio $D_{FB}$ is calculated in dependency on the error. The feedback duty ratio $D_{FB}$ includes a proportional plus integral (PI) component. The feedback duty ratio $D_{FB}$ is represented as follows.

$$D_{FB} = D_{In} + Dp$$

where $D_{In}$ is an integral component and Dp is a proportion component. $D_{In}$ is represented as $$D_{In} = Do + \Delta I$$

where Do is an integral component calculated at the last routine of a program, and $\Delta I$ is an increment of the integral component. The proportion component Dp and the increment $\Delta I$ are stored in a table 36 in dependency on the difference $\Delta P$ as shown in FIG. 3b. In the table, Dpu and $\Delta Iu$ are provided for increasing the duty ratio $D_{FB}$ and Dpd and $\Delta Id$ are provided for decreasing the ratio $D_{FB}$. Each of the proportion components and increments is an increasing function of the difference $\Delta P$.

The feedback duty ratio $D_{FB}$ thus calculated is fed to a duty ratio calculator 33 to which the basic duty ratio $D_B$ is also fed to calculate a duty ratio D in accordance with $$D = D_B + D_{FB}$$

A control pulse signal having the duty ratio D is applied to the solenoid operated valve 16 through a driver 37.

In accordance with the present invention, the control unit 30 further has a system for correcting the duty ratio when the vehicle is rapidly accelerated. A rapid acceleration determining section 38 determines the rapid acceleration of the vehicle when a throttle opening degree $\theta$ detected at the throttle position sensor 23 is larger than a predetermined reference degree $\theta 1$ ($\theta \geq \theta 1$).

In addition a pressure peak detector 40 is provided to detect that the intake pressure passed a peak. The detector 40 detects the pressure peak when pressure changing rate dPd/dt is smaller than zero (dPb/dt < 0), and feeds a pressure peak signal to a control mode determining section 39. The determining section 39 is provided with a timer to calculate a time T from the detection of the rapid acceleration to the detection of the pressure peak.

The control operation is described hereinafter with reference to FIGS. 4a, 4b and 5. The turbine 4b of the turbocharger 4 is driven by the exhaust gas, thereby driving the compressor 4a. The intake air is compressed by the compressor and supplied to the cylinders of the engine. At the partial load state of the engine represented as $\theta < \theta_1$ (step 101), in order to maintain the intake pressure below the limit pressure Pt, the control mode determining section 39 decides to execute the feedforward control and the feedback control only for decreasing the actual intake pressure (step 115). Then, as the feedforward control, one of the basic duty ratios $D_B$ is derived from the table 32 in dependency on the intake pressure Pb and the engine speed Ne. On the other hand, since the optimum intake pressure at the partial load is below the limit pressure Pt, the feedback duty ratio $D_{FB}$ calculated at the feedback duty ratio calculator 35 is zero, $D_{FB} = 0$. Accordingly, the duty ratio D depending on the basic duty ratio $D_B$ is outputted from the duty ratio calculator 33 to operate the solenoid operated valve 16. The actuating pressure controlled by the solenoid operated valve is applied to the actuators 13 and 14 through the passage 17 to actuate the wastegate valve 11 and the vane 4c. When the intake pressure Pb and the engine speed Ne are low, the basic duty ratio $D_B$ is large, so that opening period of the leak port 16d is much longer than closing period. As a result, a low pressure is applied to the actuator 13 so that the diaphragm is urged by a spring of the actuator to close the wastegate valve 11. On the other hand, the vane 4c is operated by the actuator 14 to increase the opening area of the exhaust pipe 9 at the vane. Thus a large quantity of air is supplied to the turbine 4b to increase the supercharging pressure.

As the intake pressure Pb and the engine speed Ne increase, the ratio $D_B$ derived from the table 32 decreases so that the pressure applied to the actuators 13 and 14 rises. Thus the wastegate valve 11 opens a predetermined amount and the vane 4c is rotated to decrease the amount of air supplied to the turbine 4b. Therefore, the intake pressure Pb is kept below the limit pressure Pt, thereby preventing damaging of the engine 1.

If the intake pressure Pb exceeds the limit pressure Pt at the partial load, the feedback duty ratio calculator 35 calculates a feedback duty ratio $D_{FB}$ based on the proportion decreasing component Dpd and integral decrement $\Delta Id$ derived from the table 36 in dependency on the difference $\Delta P$ which is calculated at the calculator 34. The feedback ratio $D_{FB}$ for decreasing the intake pressure Pb is added to the basic duty ratio $D_B$ at the calculator 33 to obtain a corrected duty ratio D. Thus the duty ratio D is decreased stepwisely, thereby discharging the exhaust gas through the wastegate valve 11 to rapidly decrease the intake pressure.

The feedback control operation at the rapid acceleration is described hereinafter with reference to FIGS. 4a, 4b and 5.

Figure 4A:
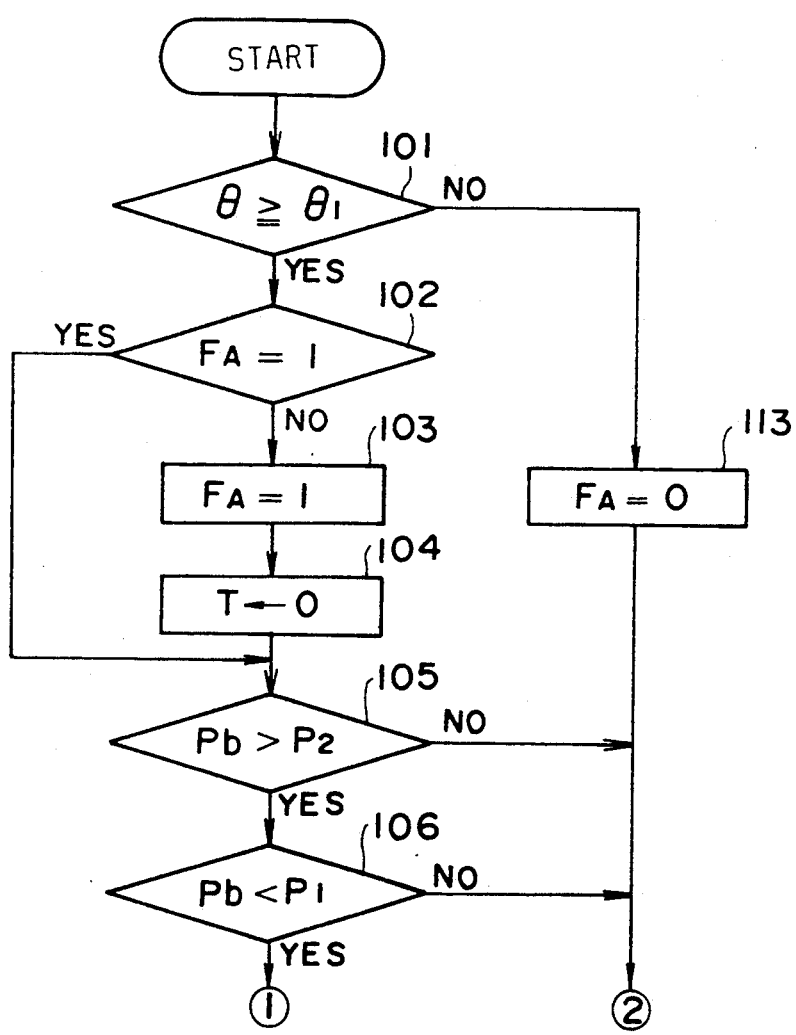
FIGS. 4a and 4b are flowcharts showing the operation of the present invention.
Figure 4B:
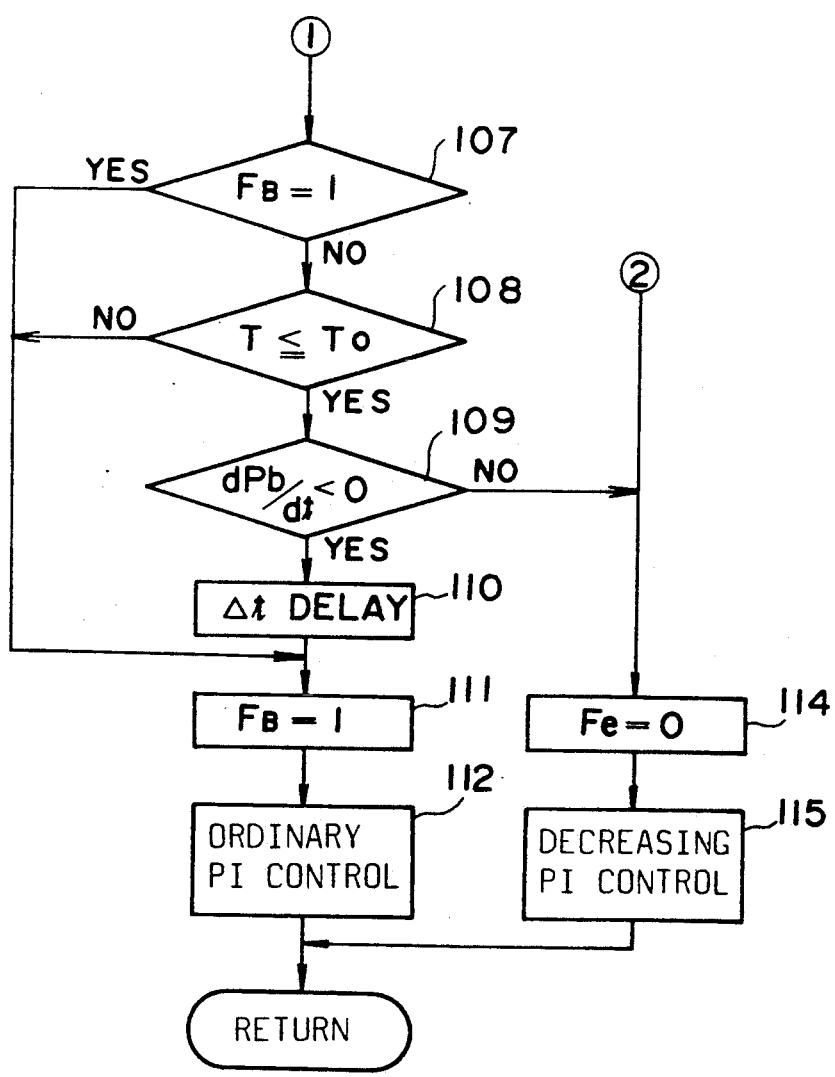

Referring to FIG. 4a, when the throttle opening degree $\theta$ is smaller than the reference degree $\theta 1$ at a step 101, a decreasing feedback duty ratio is added to the basic duty ratio and the above-described operation is performed at a step 115.

When the throttle opening degree $\theta$ exceeds the reference degree $\theta 1$, the timer in the section 39 is set at a step 104.

When it is determined that the actual pressure Pb is between reference pressures P2 and P1, (steps 105, 106), the program proceeds to a step 108 through a step 107.

Time T from the detection of the rapid acceleration ($\theta \geq \theta_1$) to the detecting of the peak is compared with a reference time To at a step 108. If the time T is shorter than the time To, (T $\leq$ To), the program goes to a step 109 where it is determined whether the peak of the intake pressure is detected by the detector 40. When the peak is detected, the program goes to a step 110 where a predetermined short time Δt after the peak of the pressure is counted to delay for improving the reliability of the control. After the time Δt, the program proceeds to a step 112 where an ordinary PI feedback control is carried out, so that the intake pressure Pb is maintained approximately at the limit pressure Pt in accordance with increasing and decreasing the intake pressure by feedback control until the throttle opening degree lowers under the reference degree $\theta 1$.

When the time T is larger than the reference time To, the program goes to the step 112 where the ordinary feedback control is performed, so that the intake pressure Pb immediately converges to the limit pressure Pt.

Figure 5:
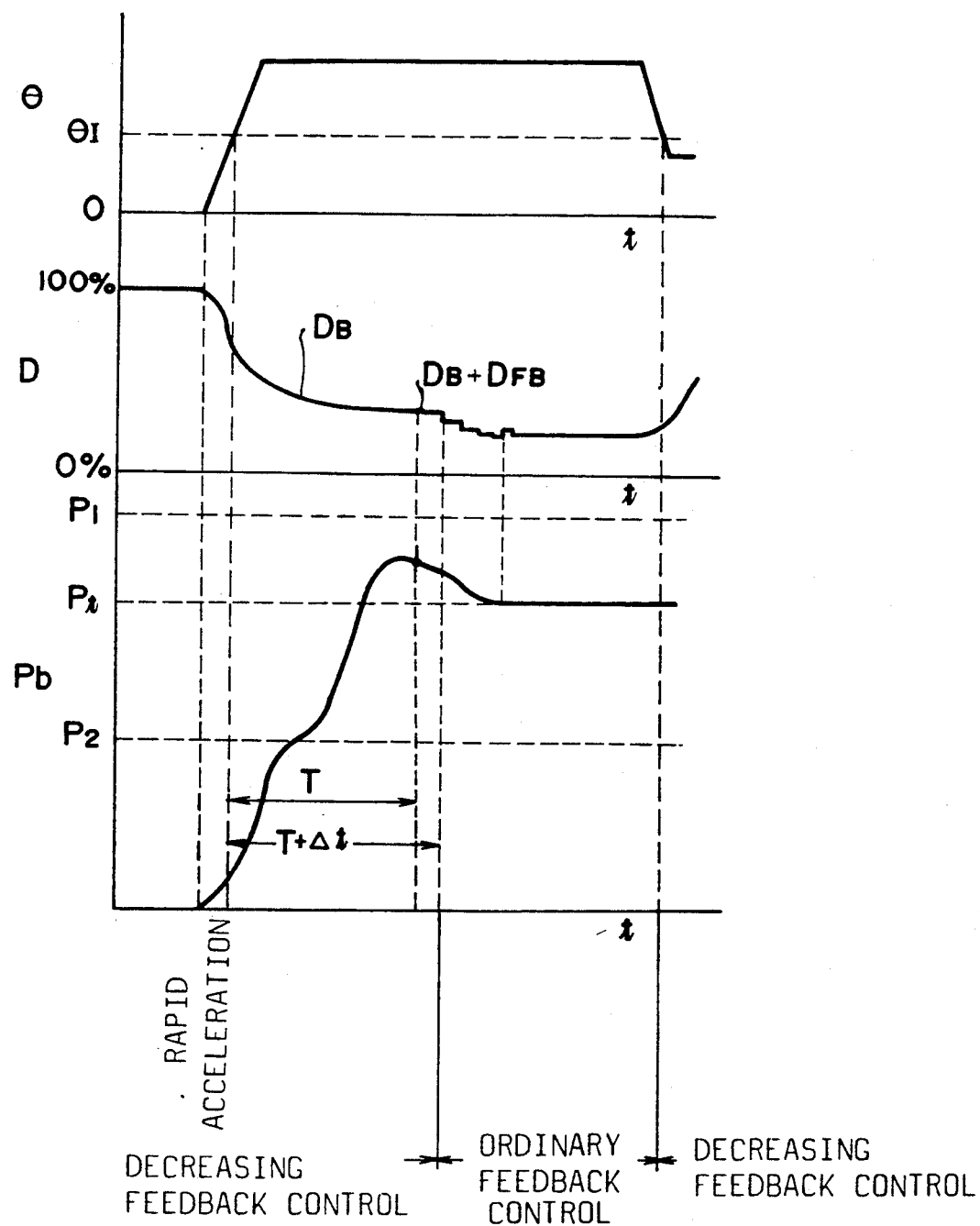
FIG. 5 is a graph showing characteristics of the duty ratio and supercharging pressure at rapid acceleration.

In the period T+Δt, as shown in FIG. 5, i.e. when $Pd \leq P_2$, $Pd \geq P_1$, or when $dPd/dt \geq 0$, the program goes to the step 115 to perform the pressure decreasing feedback control dependent on the proportion decreasing component Dpd and the decrement ΔId.

The above-described system may be arranged such that the basic duty ratio $D_B$ and the feedback duty ratio $D_{FB}$ are derived further in accordance with coolant temperature and atmospheric pressure.

According to the present invention, since the intake pressure is controlled in accordance with the basic duty ratio for producing the optimum intake pressure at the partial load state, stable control is maintained. Furthermore, since the feedback control for increasing and decreasing the intake pressure is executed after the detection of the peak of the intake pressure in the acceleration state, the overshooting of the intake pressure from the limit pressure is immediately reduced and the intake pressure converges to the limit pressure.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In an intake air control system for an automotive engine with a turbocharger driven by exhaust gas from said engine having a compressor in an intake passage for pressurizing intake air, a solenoid valve interposed between an inlet side and an outlet side of said compressor, an intake air pressure sensor provided in said intake passage for detecting pressure of induced air-fuel mixture and for generating a pressure signal, an engine speed sensor for detecting engine speed and for generating an engine speed signal, and a throttle position sensor for detecting opening degree of a throttle valve in said intake passage and for producing a degree signal, the improvement in the system which comprises:

basic duty ratio determining means responsive to said pressure signal and said engine speed signal for determining a basic duty ratio by reference to a basic duty ratio map and for producing a basic duty ratio signal to actuate said solenoid valve;

rapid acceleration determining means responsive to said degree signal for determining a rapid acceleration and for generating a rapid acceleration signal;

pressure peak detector means responsive to said pressure signal for detecting a highest value of said pressure during said rapid acceleration and for producing a peak value signal;

control mode determining means responsive to said rapid acceleration signal and said peak value signal for calculating a time period from a starting time of said rapid acceleration to a time of occurrence of said peak value signal and for generating a time signal;

feedback duty ratio calculating means responsive to said pressure signal and said time signal for calculating a feedback duty ratio by comparing a proportion and integral component with a reference value in a table and for producing a feedback duty ratio signal; and duty ratio calculating means responsive to said basic duty ratio signal and said feedback duty ratio signal for adding said feedback duty ratio to said basic duty ratio in order to operate said solenoid valve so as to rapidly decrease said pressure in a transient state of said engine.

2. The intake air control system as set forth in claim 1, wherein said rapid acceleration determining means determines said rapid acceleration by comparing actual operating speed of said throttle valve with a predetermined operating speed.

3. The intake air control system as set forth in claim 1, wherein said pressure peak detector means detects the highest value of said pressure during said rapid acceleration when the time derivative of said pressure becomes less than zero.

4. The intake air control system as set forth in claim 1, wherein said control mode determining means is further responsive to said pressure signal for calculating said time period.

5. The intake air control system as set forth in claim 1, wherein said feedback duty ratio calculating means is responsive to the difference between said pressure signal and a limit pressure signal representing a desired limit pressure for calculating said feedback duty ratio.

6. The intake air control system as set forth in claim 5, wherein said limit pressure is set to a maximum pressure for a full throttle state of the engine.

7. The intake air control system as set forth in claim 1, wherein said rapid acceleration determining means determines said rapid acceleration when said degree signal represents an opening degree of the throttle valve greater than a predetermined reference degree.

8. The intake air control system as set forth in claim 1, wherein said time period calculated by said control mode determining means if less than a reference time is increased by a predetermined short time.

9. The intake air control system as set forth in claim 1, wherein said feedback duty ratio calculating means and said basic ratio determining means are responsive to engine coolant temperature and atmospheric pressure for determining said feedback duty ratio and said basic duty ratio.

10. The intake air control system as set forth in claim 5, wherein said integral component comprises an integral component at a least routine plus an increment, and said increment and said proportion component are increasing functions of said difference, and said feedback duty ratio calculating means calculates said feedback duty ratio by adding said proportion and integral components.

11. In an intake air control system for an automotive engine with a turbocharger driven by exhaust gas from said engine having a compressor in an intake passage for pressurizing intake air, a solenoid valve interposed between an inlet side and an outlet side of said compressor, an intake air pressure sensor provided in said intake passage for detecting pressure of induced air-fuel mixture and for generating a pressure signal, an engine speed sensor for detecting engine speed and for generating an engine speed signal, and a throttle position sensor for detecting opening degree of a throttle valve in said intake passage and for producing a degree signal, the improvement in the system which comprises:

basic duty ratio determining means responsive to said pressure signal and said engine speed signal for determining a basic duty ratio by reference to a basic duty ratio map and for producing a basic duty ratio signal to actuate said solenoid valve;

rapid acceleration determining means responsive to said degree signal for determining a rapid acceleration and for generating a rapid acceleration signal;

pressure peak detector means responsive to said pressure signal for detecting a highest value of said pressure during said rapid acceleration and for producing a peak value signal;

control mode determining means responsive to said rapid acceleration signal and said peak value signal for calculating a time period from a starting (detecting) time of said rapid acceleration to a time of occurrence of said peak value signal and for generating a time signal;

feedback duty ratio calculating means responsive to said time signal and the difference between said pressure signal and a limit pressure signal for calculating a feedback duty ratio from a proportion and integral component obtained from a table as a function of said difference and for producing a feedback duty ratio signal corresponding to said feedback duty ratio for control of said solenoid valve after a predetermined short time after the detecting of said highest value when said time period is shorter than a reference time and immediately after said detecting of said highest value when said time period is longer than said reference value; and duty ratio calculating means responsive to said basic duty ratio signal and said feedback duty ratio signal for adding said feedback duty ratio to said basic duty ratio in order to operate said solenoid valve so as to rapidly decrease said pressure in a transient state of said engine.

* * * * *